Patented Mar. 30, 1937

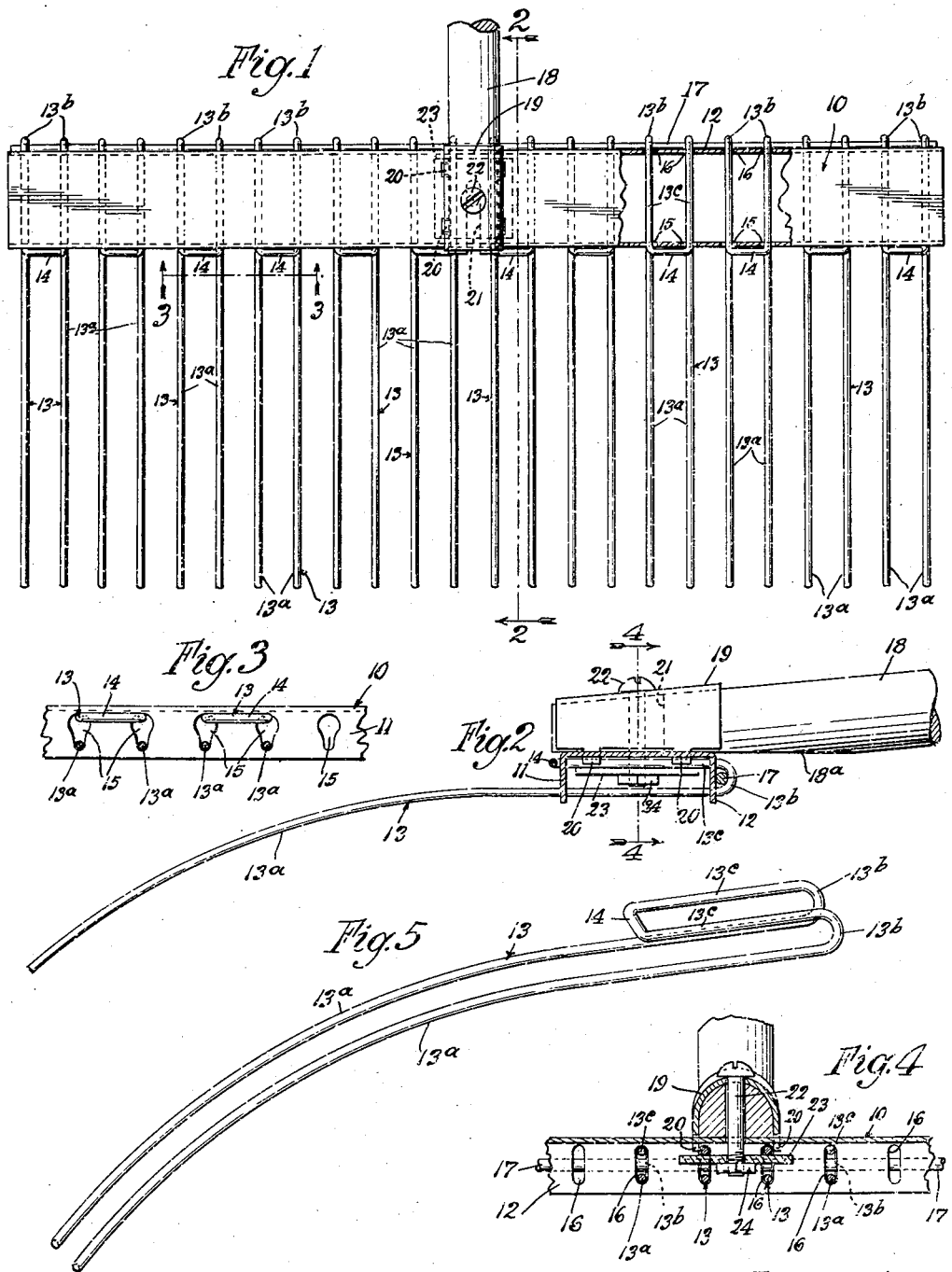

2,075,220

UNITED STATES PATENT OFFICE 2,075,220

RAKE

Sebastian P. Neuhausen, Lombard, Ill.

Application December 9, 1935, Serial No. 53,498

5 Claims. (Cl. 55—114)

This invention relates to improvements in rakes.

One object of the invention is to provide a rake having tines formed in integral pairs which can be assembled and secured in a cross head in a simple and economical manner.

Another object of the invention is to provide a rake comprising a cross head having front and rear flanges through openings in which flexible tines extend and which enable the tines to flex in use throughout the length of the tines.

Other objects relate to various features of construction and arrangement of parts which will be apparent from a consideration of the following specification and accompanying drawing, wherein:

Figure 1 is a broken top plan view of a rake embodying the present improvements.

Figure 2 is a sectional view taken on line 2—2 of Figure 1.

Figure 3 is a sectional view taken on line 3—3 of Figure 1.

Figure 4 is a sectional view taken on line 4—4 of Figure 2.

Figure 5 is a perspective view illustrating a pair of integral tine members.

In the drawing, 10 indicates generally a cross head of sheet metal having a front flange 11 and a rear flange 12. The flanges are apertured to receive the tines indicated generally by the numeral 13 which, as shown in Figure 5, are formed in integral pairs of spring wire. As shown in Figure 5, the individual tines 13a are united integrally by a bight 14, thus forming a U-shaped or hairpin shaped structure, the closed end of which is thereafter folded over the tines, but in spaced relation with respect thereto. The flanges 11 and 12 are provided with aligned vertical slots 15 and 16 respectively, the slots 15 as shown in Figure 3 being enlarged somewhat at their upper ends. To insert the tines in position, the U-shaped ends 13b are passed through a pair of openings 15 and through the corresponding or aligned openings 16 in the rear flange 12. It will be noted in Figure 2 that the ends 13b project slightly beyond the flange 12 and that the bight 14 spans the portion of the front flange 11 intermediate the openings 15 through which the U-shaped portions of the tine members extend.

When the tines have been assembled in the cross head as mentioned, they are anchored in such position by passing a wire 17 between the rear flange 12 and the looped ends of the tines formed by the bights 13b. The wires or rods 17 can be held in position, if desired, by welding, although it has been found not necessary to so attach the rods to the flange 12 provided the rod fits securely between the flange and the bights 13b. The rod 17 prevents dislodgment of the tines in a forward direction, while the bights 14 prevent rearward movement of the tines with reference to the cross head 10.

As will be noted, each tine is of U-shape, the tine proper 13a constituting one arm of the U, while the portion 13c constitutes a short arm of the U, which arms are flexibly connected by the respective bights 13b. When the rake is used the arm or tines 13a can flex upwardly within the recesses 15 from the bights 13b and thus the tines do not tend to bend and become deformed at the points where they pass through the front flange 11 as would be the case were the openings 15 of a size just large enough to receive the tines.

The upper ends of the slots 15 as shown in Figure 3, are somewhat enlarged at their upper ends to accommodate limited lateral movement of the tines during use of the rake. The rake is very satisfactory in raking leaves, grass, etc., from a lawn, or in removing accumulated leaves from bushes.

The handle 18 may be attached to the cross head by any approved means, but preferably by a ferrule 19 provided with lugs 20 which pass through openings in the cross head 10. The ferrule 19 is substantially semi-circular in cross section, as shown in Figure 4, and the end of the handle 18 is provided with a flat face 18a which rests on the top surface of the crosshead 10. The forward end of the handle is provided with a slot 21 which enables the same to be placed into the position shown in Figure 1. A bolt 22 passes through the ferrule and the top face of the crosshead and through a washer 23. The lower end of the threaded bolt is provided with a nut 24 whereby the ferrule 19 can be tightened down against the end of the handle to clamp the same firmly in position. When the nut is removed it will be seen that the ferrule can also be removed.

It is thus possible to ship the rake heads packed in flat packages and the ferrule and handles in separate packages, if desired.

While I have shown and described an embodiment of my improvements for the purpose of illustration, I do not wish to be restricted specifically thereto except so as limited by the appended claims.

I claim:

1. A rake comprising a cross head provided with front and rear flanges provided with aligned openings therethrough, tines formed in integral pairs of U-shape extending through the openings of said flanges, and means cooperating with said rear flange and passing through each of the tines at the rear ends thereof for restraining forward displacement of the tines.

2. A rake comprising a cross head provided with front and rear flanges provided with aligned vertically elongated openings, tines in said openings formed in integral pairs of U-shape having the base thereof folded toward the free ends of the tines, the connecting bight of said folded portions of said tines being arranged to span the space between two adjacent openings of said front flange to prevent rearward movement of the respective tines, and means on the rear flange for restraining forward displacement of said tines with respect to said cross head.

3. A rake comprising a transverse head provided with front and rear flanges, said flanges having aligned tine receiving openings therein, wire tines formed in integral pairs of U-shape extending through said openings, having the united ends folded forwardly to provide a loop at the rear end of each tine of the pair, and means passing through said loops for retaining said tines against forward displacement with respect to said head.

4. A rake comprising a cross head provided with front and rear flanges having aligned vertical slots therein, tines formed in pairs, the rear portion of the tines of each pair being of U-shape and comprising a short arm united by an integral bight with a short arm of the other tine of the pair, said U-shaped portions of each pair of tines being disposed within adjacent aligned slots of said flanges with said bight spanning the front flange between the respective slots and with the connected ends of the arms of each pair of tines projecting through the corresponding openings of the rear flange, and a fastening member extending through said projecting ends.

5. A rake comprising a cross head having front and rear flanges provided with aligned slots therein, tines in said slots, said tines being formed in integral pairs shaped to engage the portion of said front flange between adjacent slots and having U-shaped portions at the rear projecting through the corresponding rear slots, and a member engaging said portions and said rear flange for securing said tines in position.

SEBASTIAN P. NEUHAUSEN.